US011119489B1

(12) United States Patent
Nagelberg et al.

(10) Patent No.: US 11,119,489 B1
(45) Date of Patent: Sep. 14, 2021

(54) AUTONOMOUS VEHICLE HAVEN SEEKING SYSTEM AND METHOD

(71) Applicant: United Services Automobile Association (USAA), San Antonio, TX (US)

(72) Inventors: Alexander B. Nagelberg, San Antonio, TX (US); Bradly Jay Billman, Celina, TX (US); Donnette L. Moncrief Brown, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 15/648,280

(22) Filed: Jul. 12, 2017

Related U.S. Application Data

(60) Provisional application No. 62/361,849, filed on Jul. 13, 2016.

(51) Int. Cl.
*G05D 1/02* (2020.01)
*G08G 1/14* (2006.01)
*G08G 1/0967* (2006.01)
*G08G 1/0968* (2006.01)

(52) U.S. Cl.
CPC ......... *G05D 1/0214* (2013.01); *G05D 1/0276* (2013.01); *G08G 1/096725* (2013.01); *G08G 1/096827* (2013.01); *G08G 1/143* (2013.01)

(58) Field of Classification Search
CPC .................................................. G05D 1/0214
USPC .......................................................... 701/25
See application file for complete search history.

(56) References Cited

U.S. PATENT DOCUMENTS

| 5,597,335 | A | * | 1/1997 | Woodland | B63B 7/082 |
| | | | | | 441/36 |
| 9,587,952 | B1 | * | 3/2017 | Slusar | G01C 21/3492 |
| 9,811,085 | B1 | * | 11/2017 | Hayes | G06N 5/04 |
| 9,944,282 | B1 | * | 4/2018 | Fields | G05D 1/0055 |
| 10,060,751 | B1 | * | 8/2018 | Chen | G06F 16/29 |
| 10,621,515 | B2 | * | 4/2020 | Kreiner | G06Q 50/30 |
| 2009/0299857 | A1 | * | 12/2009 | Brubaker | G06Q 30/0247 |
| | | | | | 705/14.66 |
| 2009/0316671 | A1 | * | 12/2009 | Rolf | H04W 4/02 |
| | | | | | 370/338 |
| 2010/0256852 | A1 | * | 10/2010 | Mudalige | G08G 1/22 |
| | | | | | 701/24 |
| 2010/0270389 | A1 | * | 10/2010 | Feldman | A01G 15/00 |
| | | | | | 239/2.1 |
| 2011/0137685 | A1 | * | 6/2011 | Tracy | G06Q 40/08 |
| | | | | | 705/4 |
| 2011/0309953 | A1 | * | 12/2011 | Petite | G08C 17/02 |
| | | | | | 340/932.2 |
| 2014/0210646 | A1 | * | 7/2014 | Subramanya | G06K 9/00812 |
| | | | | | 340/928 |
| 2014/0218527 | A1 | * | 8/2014 | Subramanya | G01S 13/50 |
| | | | | | 348/148 |
| 2014/0336935 | A1 | * | 11/2014 | Zhu | G01S 17/86 |
| | | | | | 702/3 |

(Continued)

*Primary Examiner* — Jean Paul Cass
(74) *Attorney, Agent, or Firm* — Fletcher Yoder, P.C.

(57) ABSTRACT

A system configured to cause a vehicle to autonomously maneuver to a safe haven during a triggering event includes a communication component configured to receive parameters corresponding with conditions of the triggering event and, based on the parameters and on characteristics of the safe haven, instruct the vehicle to maneuver to the safe haven.

20 Claims, 3 Drawing Sheets

(56) References Cited

U.S. PATENT DOCUMENTS

| | | | |
|---|---|---|---|
| 2015/0329111 A1* | 11/2015 | Prokhorov | B60W 10/18 |
| | | | 701/41 |
| 2015/0346727 A1* | 12/2015 | Ramanujam | B62D 15/0285 |
| | | | 701/23 |
| 2016/0171894 A1* | 6/2016 | Harvey | G05D 1/0293 |
| | | | 701/23 |
| 2016/0299256 A1* | 10/2016 | Modi | G01V 1/30 |
| 2017/0098373 A1* | 4/2017 | Filley | G08G 1/096708 |
| 2017/0102700 A1* | 4/2017 | Kozak | G05D 1/0061 |
| 2017/0146350 A1* | 5/2017 | Beaurepaire | H04W 12/08 |
| 2017/0146353 A1* | 5/2017 | Kroeller | G08G 1/012 |
| 2017/0213165 A1* | 7/2017 | Stauffer | G06Q 10/02 |
| 2017/0227972 A1* | 8/2017 | Sabau | G08G 1/22 |
| 2017/0228258 A1* | 8/2017 | Shifman | G06F 9/5027 |
| 2017/0243490 A1* | 8/2017 | Leppanen | B60K 35/00 |
| 2017/0301220 A1* | 10/2017 | Jarrell | H04W 4/38 |
| 2018/0011485 A1* | 1/2018 | Ferren | G05D 1/0061 |
| 2018/0063002 A1* | 3/2018 | Filley | G08G 1/012 |
| 2018/0072313 A1* | 3/2018 | Stenneth | G08G 1/0112 |
| 2018/0074513 A9* | 3/2018 | Harvey | B60Q 1/50 |
| 2018/0113880 A1* | 4/2018 | Metcalf-Putnam | |
| | | | G06F 16/24532 |
| 2018/0224291 A1* | 8/2018 | Tuukkanen | G08G 1/096811 |
| 2018/0348343 A1* | 12/2018 | Achour | H01Q 3/44 |
| 2019/0051172 A1* | 2/2019 | Stenneth | H04W 4/44 |
| 2019/0055015 A1* | 2/2019 | Allard | B60R 16/0234 |

\* cited by examiner

AUTONOMOUS VEHICLE HAVEN SEEKING SYSTEM AND METHOD

CROSS REFERENCE TO RELATED APPLICATION

This application claims priority to and the benefit of U.S. Provisional Application No. 62/361,849, entitled "AUTONOMOUS VEHICLE HAVEN SEEKING SYSTEM AND METHOD," filed Jul. 13, 2016, which is hereby incorporated by reference in its entirety for all purposes.

BACKGROUND

The present disclosure relates generally to systems and methods for securing or protecting a vehicle. Specifically, the present disclosure relates to a system and method for causing a vehicle to autonomously seek a safe haven.

Traditionally, vehicles are manually operated by a user to maneuver from one place to another. It is often advantageous for the user to maneuver the vehicle to, or position the vehicle in, a safe location to avoid damage to the vehicle. For example, the user may manually drive the vehicle to a garage if a hail storm is occurring or expected to occur. Unfortunately, the user may not always be able to access the vehicle, and forces of nature (e.g., hail storms, high winds, flooding, hurricanes, tornados, or fires) may cause damage to the vehicle if the vehicle is not in a secured location. Accordingly, improved security features of a vehicle are desired.

BRIEF DESCRIPTION

An embodiment of the present disclosure includes a system configured to cause a vehicle to autonomously maneuver to a safe haven during a triggering event. The system includes a communication component configured to receive parameters corresponding with conditions of the triggering event and, based on the parameters and on characteristics of the safe haven, instruct the vehicle to maneuver to the safe haven.

Another embodiment of the present disclosure includes a method of managing autonomous vehicles. The method includes receiving location data indicative of a location of an autonomous vehicle, and receiving event data indicative of parameters of a triggering event. The method also includes determining, based at least in part on the parameters of the triggering event, a path of the autonomous vehicle between the location of the autonomous vehicle and a safe haven, and instructing the autonomous vehicle to take the path from the location of the autonomous vehicle to the safe haven.

Another embodiment of the present disclosure includes a tangible, non-transitory, computer readable medium storing instructions thereon. The instructions are configured to cause a processor, when executed, to: receive vehicle data indicative of parameters of an autonomous vehicle, receive safe haven data indicative of parameters of a safe haven, and receive event data indicative of parameters of a triggering event. The instructions are also configured to cause the processor, when executed, to: determine, based at least in part on the vehicle data, the safe haven data, and the event data, a route between the autonomous vehicle and the safe haven, and instruct the vehicle to take the route to the safe haven.

DRAWINGS

These and other features, aspects, and advantages of the present disclosure will become better understood when the following detailed description is read with reference to the accompanying drawings in which like characters represent like parts throughout the drawings, wherein.

Figure 3:
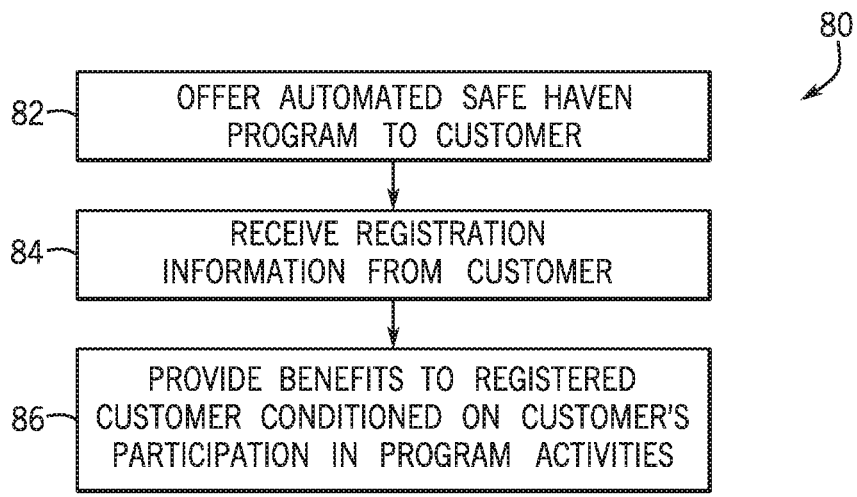
Figure 4:
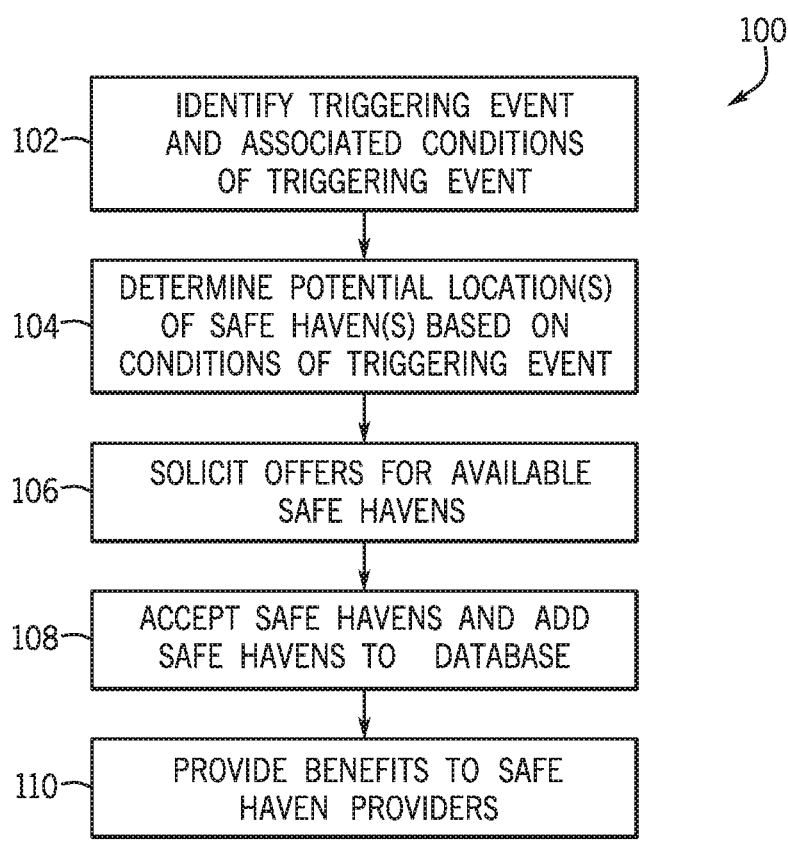

FIG. 3 is a flow chart of a method of incentivizing a customer to register for a program configured to enable the customer's vehicle to autonomously seek a safe haven to protect the customer's vehicle, in accordance with an aspect of the present disclosure; and FIG. 4 is a flow chart of a method of incentivizing a third party to provide a safe haven for vehicles to autonomously seek a safe haven, in accordance with an aspect of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are directed toward systems and methods for securing a vehicle (e.g., a vehicle having autonomous driving capabilities). Specifically, the present disclosure relates to a system and method for causing a vehicle to autonomously seek a safe haven. For example, a service provider may offer a program that enables a registered participant's vehicle to autonomously seek a safe haven during a particular triggering event (e.g., a hail storm, a wind storm, a fire, flooding, a hurricane, or a tornado), where the particular triggering event may be capable of damaging the participant's vehicle if the participant's vehicle is not moved. In accordance with the present disclosure, "safe haven" is referred to herein as meaning an area deemed appropriate for receiving autonomous vehicles during a triggering event such as a hail storm or tornado, namely, parking lots, parking structures, parking garages, and other facilities.

The service provider may maintain a system having a database (e.g., a memory) that stores information of participants and the participants' vehicles. The system may also include a communication component (e.g., two-way communication component) configured to send and receive communications (e.g., via radio waves, wireless communication, or some other communication means) to and from the vehicles of the program participants. In some embodiments, the communications component may refer to two or more separate parts, namely, a receiving part and a sending part. The communication component may also send and receive communications to and from other sources, such as from a weather broadcasting service. The system may include, in addition to the database and the communication component, an analysis component (e.g., a processor) configured to determine, based on information associated with the communications received by the communication component, whether a particular current or pending triggering event (e.g., hail storm, tornado, hurricane, wind storm, fire, or flooding) warrants moving vehicles to safe havens. After the analysis component (or some other processor associated with the communication component) determines that moving the vehicles to a safe haven is warranted, the analysis component may determine where to move the vehicles, and along what path to move the vehicles. The analysis component may determine the desired location(s) and the desired route(s) for the vehicles based on communications received by the communication component, where the communications may include information or parameters relating to the current or pending event, relating to the relative locations of the vehicles and the safe havens, relating to whether locations or routes have been compromised, and other factors.

Before or after determining the desired location(s) and route(s) to move the vehicles, the analysis component may determine whether any available safe havens exist in the desired location(s). For example, the analysis component may first determine the availability of safe havens and then determine whether the available safe havens are within desired (e.g., protected) locations and include desired (e.g., protected) routes between the available safe havens and a particular vehicle. Additionally or alternatively, the analysis component may first determine desired (e.g., protected) locations and corresponding routes and then survey those desired locations for available safe havens. In embodiments where the desired locations do not include any available safe havens, the communication component of the service provider's system may solicit offers from (or send offers to) local third parties within the locations and authorized to provide, for example, their place of business (e.g., a parking garage, a sport stadium, or a parking lot) as an available safe haven.

After the analysis component determines where (and along what route) to send the participants' vehicles, the communication component may communicate instructions to the vehicles (e.g., via wireless communication, radio waves, or other communication means). The instructions may cause the vehicle(s) to autonomously maneuver along the determined route(s) to the determined safe haven(s). It should be noted that the system may identify several safe havens and, based on certain factors (e.g., various locations of all the vehicles of all the participants, and characteristics of each vehicle), may send a first vehicle along a first path to a first safe haven, and a second vehicle along a second path to a second safe haven. In other words, the system may identify the appropriate or desired safe haven and route for each vehicle individually. For example, a vehicle with four wheel drive may be capable of using a route that another vehicle would be directed to avoid. Further, based on relative locations of the vehicles and available safe havens, different routes and final destinations may be desired for different vehicles. Once a particular vehicle has reached its corresponding safe haven, the vehicle may send a communication directly to the vehicle's owner or user (e.g., program participant), or indirectly to the vehicle's owner by way of the communication component of the service provider's system, that the vehicle has reached its destination. For example, the vehicle's owner or user (e.g., program participant) may receive confirmation of safe arrival via text, email, phone call, or some other communication. Similar communication may occur prior to embarking to confirm user approval.

Figure 1:
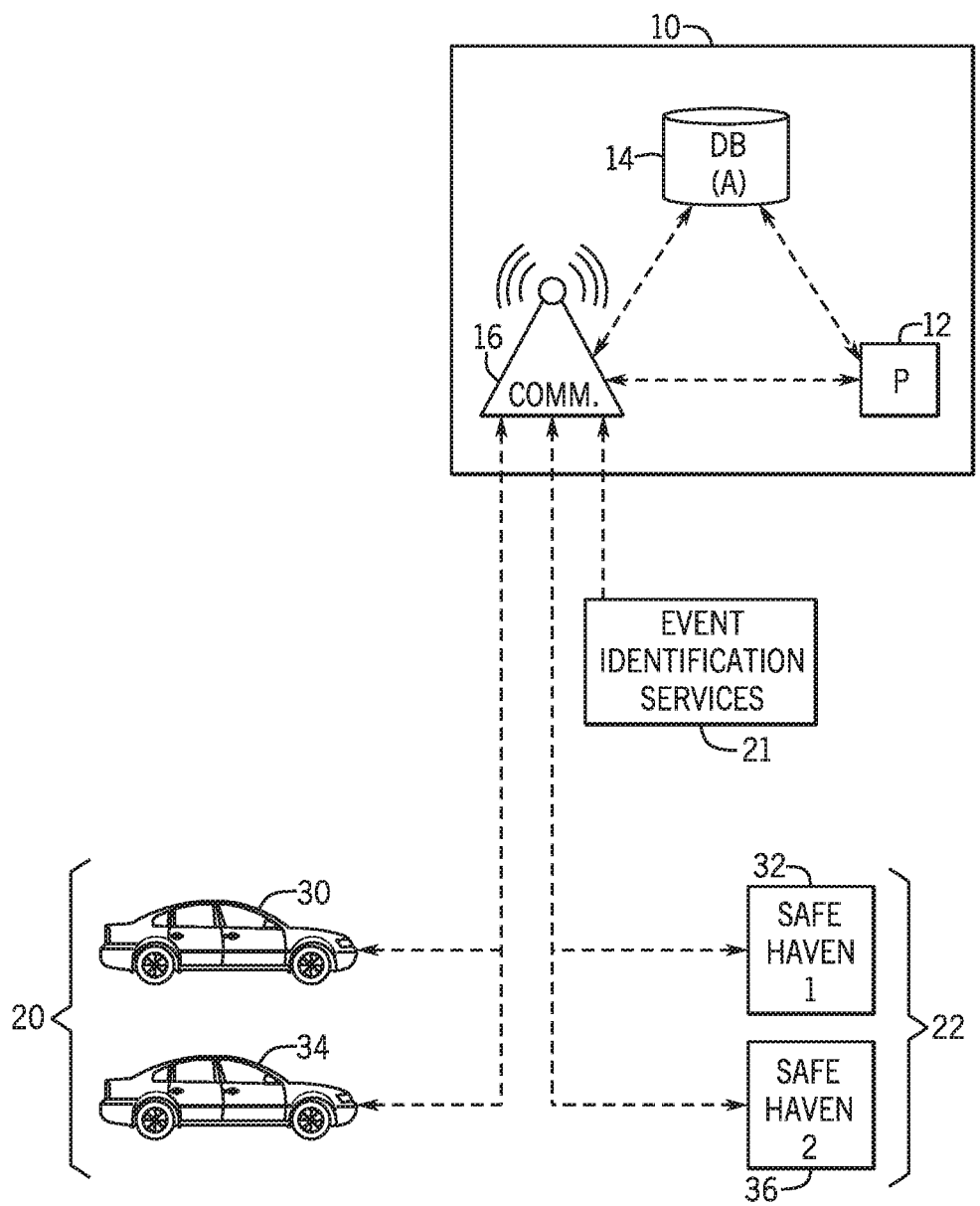
FIG. 1 is a schematic illustration of an embodiment of a system for causing an vehicle to autonomously seek a safe haven to protect the vehicle from damage, in accordance with an aspect of the present disclosure.

FIG. 1 is an embodiment of a system 10 for causing or enabling a vehicle (e.g., vehicle having autonomous driving capabilities) to seek a safe haven during a particular event (e.g., triggering event), such as a hail storm, a wind storm, a tornado, a hurricane, or a fire. The system 10 may be owned and/or operated by a service provider that offers a program to registered participants for causing the registered participants' vehicles to autonomously maneuver to a safe haven during a particular triggering event (e.g., a hail storm, a hurricane, a tornado, a wind storm, or a fire) that may otherwise damage the vehicles.

In the illustrated embodiment, the system 10 includes an analysis component 12 (e.g., processor), a database 14 (e.g., memory), and a communication component 16 (e.g., wireless communicator or broadcaster). As shown, the analysis component 12, the database 14, and the communication component 16 may be capable of communicating with one another. Additionally or alternatively, the analysis component 12, the database 14, the communication component 16, or any combination thereof may be integrated into a single unit or module, and/or may include sub-components configured to handle various sub-routines described herein. Generally, the communication component 16 includes an input (e.g., for receiving communications) and an output (e.g., for sending communications). In other words, the communication component 16 is capable of two-way communication. Thus, the communication component 16 may be an assembly including two more sub-components or parts, such as a sending sub-component and a receiving sub-component. Further, as will be appreciated in view of the remarks below, the communication component 16 may communicate back and forth with several components.

For example, the communication component 16 may send communications to, and receive communications from, vehicles 20 owned by the participants of the program offered by the service provider. Information associated with the vehicles 20 (and, in some embodiments, other information associated with the participants) may be stored to the database 14 of the system 10. For example, locations, types, and other characteristics (e.g., four wheel drive, two wheel drive, etc.) of the vehicles 20 may be stored in the database 14.

As described in detail below, each of the vehicles 20 may communicate, to the communication component 16, the vehicle's location (e.g., continuously, or when a triggering event is identified). Additionally, each of the vehicles 20 may communicate an amount of available fuel and/or fuel mileage. The communication component 16 may also receive communications from event identification services 21, such as a weather broadcasting service, a traffic service, or any other service capable of providing information that facilitates identification of triggering events and associated conditions. It should be noted that the event identification services 21 may also communicate information relating to characterization of the triggering event (e.g., type of triggering event, extent of triggering event, duration of triggering event, and other information). Further still, the communication component 16 may be capable of sending communications to, and receiving communications from, potential safe havens 22 that may be available for receiving the vehicles 20. For example, the communication component 16 may communicate with potential safe havens 22 to solicit offers of use, and owners or operators of potential safe havens 22 may communicate to the communication component 16 that the safe haven 22 is available for use.

In accordance with present embodiments, the communication component 16 may relay relevant information to the analysis component 12 to enable the analysis component 12 to analyze whether to instruct each of the vehicles 20 to autonomously seek the safe havens 22, and along which routes to instruct each of the vehicles 20 to autonomously seek the safe havens 22. For example, the analysis component 12 may receive conditions (e.g., current location, future location, or extent) associated with the triggering event (e.g., hail storm, wind storm, fire, tornado, or hurricane) from the communication component 16, where the communication component 16 receives the conditions associated with the triggering event from the event identification services 21 and/or from the vehicles 20 themselves. Indeed, in some embodiments, the vehicles 20 may serve as beacons capable of communicating triggering event (e.g., weather) conditions (e.g., current location, future location, or extent) to the communication component 16, which subsequently relays those conditions to the analysis component 12. In general, the event identification services 21, from which the communication component 16 (and, subsequently, the analysis component 12) receives information, are intended to include all available sources of trigger event information other than the vehicles 20 (e.g., including weather broadcasting services, radio towers, the Internet, news sources, and others).

The analysis component 12, by way of the communication component 16, may also receive (e.g., from the vehicles 20) location information of the vehicles 20 and vehicle characteristics (e.g., vehicle height), as previously described. Further, the analysis component 12, by way of the communication component 16, may receive (e.g., from the safe havens 22) confirmation that the safe havens 22 are available for use, that the safe havens 22 can accommodate vehicles with certain traits (e.g., below a certain weight), location information of the available safe havens 22, and other information of the available safe havens 22 (e.g., maximum capacity, current capacity). For each of the vehicles 20, the analysis component 12 may then determine (e.g., based on the vehicle's location, an amount of fuel or fuel mileage left for the vehicle, information associated with the pending or present triggering event, availability of the safe havens 22, and/or other characteristics of the safe havens 22) whether to move each of the vehicles 20, where to move each of the vehicles 20, and along which route(s) to move each of the vehicles 20.

It should be noted that the determinations made by the analysis component 12 may differ from vehicle to vehicle. For example, the analysis component 12 may determine, for a first vehicle 30 of the vehicles 20, that the first vehicle 30 should autonomously seek a first safe haven 32 of the safe havens 22, by way of a first route. The analysis component 12 may determine, for a second vehicle 34 of the vehicles 20, that the second vehicle 34 should autonomously seek a second safe haven 36 of the safe havens 22, by way of a second route. In other words, the analysis component 12 may individually determine the route and safe haven 32, 36 most appropriate for each individual vehicle 30, 34 of the vehicles 20 (e.g., of the vehicles 20 having information stored in the database 14). Determinations by the analysis component 12 may include analysis of an assortment of factors, including the locations of the vehicles 20, the locations of the safe havens 22, the available routes between the vehicles 20 and the safe havens 22, the condition of the safe havens 22 and of the routes between the vehicles 20 and the safe havens 22, the extent of the triggering event, the current or future location of the triggering event, vehicle traits, and other factors, in accordance with the description below.

After each of the vehicles 20 reaches the appropriate one of the safe havens 22, the vehicles 20 may directly, or indirectly by way of the communication component 16, confirm to the program participants safe arrival. For example, once the first vehicle 30 reaches the first safe haven 32, the first vehicle 30 may send a communication directly to the owner or user (e.g., program participant) of the first vehicle 30. Alternatively, the first vehicle 30 may confirm safe arrival via a communication to the communication component 16 of the system 10, and the communication component 16 may send the communication or a related communication to the owner or user of the first vehicle 30 confirming safe arrival at the first safe haven 32. In some embodiments, the safe havens 22 may include geo-fences stored to the database 14 and disposed around corresponding boundaries of the safe havens 22. As the vehicle (e.g., the first vehicle 30) approaches and enters the safe haven (e.g., the first safe haven 32), the communication component 16 may be notified of the coordinates of the location of the first vehicle 30 and compare the coordinates with the coordinates of the geo-fence stored to the database 14. Once the coordinates overlap (i.e., the first vehicle 30 is within the first safe haven 32), the above described confirmation of safe arrival may be initiated.

It should be noted that, in some embodiments, the program participant may provide customized information to the communication component 16 (and/or save the information to the database 14), which the analysis component 12 considers when determining which of the safe havens 22 to instruct the participant's vehicle (e.g., the first vehicle 30) to travel to. For example, the participant may save information to the participant's account stored in the database 14. The participant may save information such as preferred safe havens, preferred routes, or other information. Further, the participant may provide information in real time during a particular triggering event. For example, the participant may provide information regarding preferred stops along the route to the safe haven (e.g., the first safe haven 32) which the participants' vehicle 30 is traveling to or is scheduled to travel to. Preferred stops may enable the participant's vehicle 30 to stop for pick-up of the participant, the participant's family members or friends, or other persons or objects.

Figure 2:
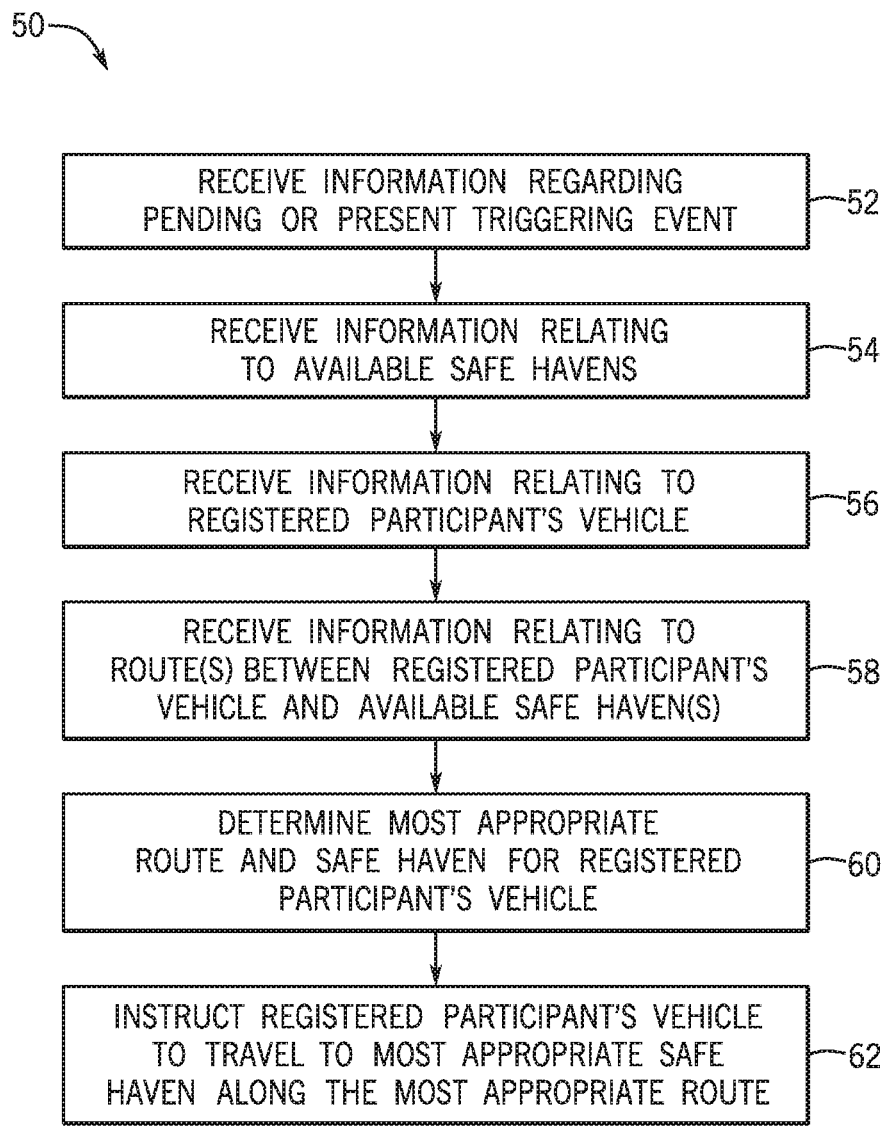
FIG. 2 is a flow chart of a method of instructing a vehicle to autonomously seek a safe haven to protect the vehicle from damage, in accordance with an aspect of the present disclosure.

A flow diagram of a method 50 of causing a vehicle to autonomously seek a safe haven, in accordance with present embodiments, is illustrated in FIG. 2. In the illustrated embodiment, the method 50 includes receiving (block 52) information regarding pending or present triggering event. For example, as previously described, event identification services (e.g., weather broadcasting services, news sources, vehicles, or other beacons of information) may provide information relating to the type of triggering event, the extent of the triggering event, the effect of the triggering event (e.g., effects on the locale's infrastructure), and other information.

The method 50 also includes receiving (block 54) information relating to available safe havens. For example, as previously described, certain safe havens may be stored to the database. The communication component may confirm availability of the stored safe havens, although certain safe havens may be stored and indicated as always being available. Additionally, the communication component may solicit (or receive) offers from third parties for use of the third parties' places of business (e.g., parking garage, parking lot, or stadium) as a safe haven. In some embodiments, the communication component may receive data indicative of other features of the safe havens, such as a maximum and current capacity of each safe haven, a location of each safe haven, and/or other characteristics.

The method 50 also includes receiving (block 56) information relating to a registered participant's vehicle. For example, as previously described, each vehicle registered in the program may send a communication to the communication component regarding a location of the vehicle (e.g., via GPS capabilities of the vehicle). Additionally or alternatively, the vehicle's owner or user (e.g., program participant) may communicate the location of the vehicle to the communication component. Further, the vehicle may communicate an estimated amount of fuel (and/or fuel mileage) of the vehicle. This may also include height, weight, capabilities, and so forth of the vehicle.

The method also includes receiving/determining (block 58) information relating to one or more routes between the registered participant's vehicle and available safe havens. For example, as previously described, triggering event identification services (e.g., weather broadcasters, news services, first responder services, or other sources) may communicate information relating to whether certain routes are currently or expected to be compromised, damaged, under heavy traffic, flooded, or otherwise unavailable for use. It should be noted that, in some embodiments, the program participant may provide information relating to preferred routes, and/or preferred stops along the preferred routes. Accordingly, the program participant's vehicle may be capable of making stops along the determined route, for example, to pick up the program participant, the participant's family or friends, or other people or objects.

The method 50 also includes determining (block 60) a most appropriate (deemed by system to be most appropriate) safe haven for the registered participant's vehicle, including a most appropriate route to the safe haven. For example, as previously described, the analysis component may take into account all the various parameters or information received by the communication component and/or saved to the database. Such information includes, but is not limited to, a location of the vehicle, relative locations of available safe havens and corresponding routes, potential damage or compromise of available safe havens and/or available routes, safe havens preferred by the participant, routes preferred by the participant, preferred stops along the routes, the extent of the triggering event, the type of triggering event, whether particular safe havens include space for various vehicles (e.g., by comparing maximum capacity with current capacity), and available fuel or fuel mileage of the vehicle.

The method 50 also includes instructing (block 62) the registered participant's vehicle to autonomously travel to the most appropriate safe haven along the most appropriate route. For example, the instructions may be sent by the communication component (e.g., via wireless communication, radio waves, or some other means) to the vehicle. The vehicle may then autonomously execute the instructions and drive itself to the determined safe haven, and along the determined route. As previously described, the instructions may include desired stops along the determined route, in order to pick up persons or objects. In some embodiments, a user or associated person may manually drive the vehicle after the vehicle autonomously drives to the user or associated person. Further, in some embodiments, the instructing step (block 62) includes querying the participant for the participant's approval. For example, the communication component may request approval of proposed instructions (e.g., to the vehicle) from the participant, and the participant may approve or deny the proposed instructions (e.g., via an input device such as a computer, a laptop, or a smartphone). In general, the communication component may request, and the participant may provide, approval of proposed instructions or proposed actions throughout the method 50 or process.

A flow diagram of a method 80 of incentivizing a customer to register for a program configured to enable the customer's vehicle to autonomously seek a safe haven to protect the customer's vehicle, in accordance with present embodiments, is shown in FIG. 3. In the illustrated embodiment, the method 80 includes offering (block 82) the program to the customer. For example, the service provider may communicate (e.g., via the previously described communication component) offers to customer's associated with another portion of the service provider's business, or the service provider may communicate offers to potential new customers. The offer may include offers of certain benefits for participation in the program. For example, the offer may include an offer of auto-insurance discount based on the participant's enrollment in the program. Further, the offer may include offers of benefits associated with other types of participation in the program. For example, the offer may include an offer of an auto-insurance discount if the participant is willing to store non-perishable foods in the vehicle, such that the vehicle, if taken to an available safe haven in which persons seek shelter (e.g., a stadium), can provide food to the persons staying at the safe haven. Other benefits may also be possible, such as one-time payments, discounts on other services, or other benefits, for the participation described above or for different types of participation.

The method 80 also includes receiving (block 84) registration information from the participant. For example, the participant may accept the offer from the service provider by enrolling or registering in the program. The participant's information, including information pertaining to the participant's vehicle, may be stored to the service provider's database. When enrolling, the participant may also be required to provide the service provider access to communicate with the participant's vehicle. Other information the participant may provide at the time of enrollment (or at any other time), as previously described, may include preferred safe havens, preferred routes, preferred stops along the preferred routes, and other information.

The method 80 also includes providing (block 86) benefits to the registered participant conditioned on the participant's participation in program activities. As previously described, the participant may be offered certain benefits (e.g., a one-time payment, a discount on auto-insurance, or other benefits) for the participant's enrollment in the program, or for other types of participation. The benefits may be distributed at the time the participant fulfills the particular participation requirement. For example, the participant may receive a first benefit upon enrolling in the program, and the participant may receive a second benefit upon agreeing to store certain types of foods (e.g., non-perishable foods) within the vehicle (and agreeing that the foods can be used by other persons upon certain conditions).

A flow diagram of a method 100 of incentivizing a third party to provide a safe haven for vehicles to autonomously seek shelter, in accordance with present embodiments, is shown in FIG. 4. In the illustrated embodiment, the method 100 includes identifying (block 102) a triggering event and associated conditions of the triggering event. For example, as previously described, the triggering event may be identified and characterized by communications sent to the communication component from event identification services (e.g., radio broadcasts services, the Internet, the vehicles themselves, and other sources).

The method 100 also includes determining (block 104) one or more potential (e.g., available, desirable, or optimal) locations for a safe haven based on conditions of the triggering event. For example, as previously described, the analysis component may determine that a particular location and/or routes to the location are not compromised (or will not otherwise enable damage to vehicles). The analysis component may prioritize locations having a high density of potential or available safe havens. In some embodiments, the method 100 also includes soliciting (block 106) offers for available safe havens (and/or receiving offers for available safe havens). For example, the analysis component may determine (e.g., by way of surveying the database) that there are no stored safe havens in the particular location, or that additional safe havens may be desired. Accordingly, the communication component may contact third party businesses or persons having potential safe havens in the particular location. For example, the third party businesses or persons may operate a parking garage, a parking lot, a stadium, or other spaces available for safely storing vehicles. The third party businesses or persons may be enrolled or registered to a contact list of the service provider, and the service provider's communication component may automatically message the third parties, seeking availability of their safe havens (e.g., parking garage, parking structure, parking lot, stadium, or other safe haven). When seeking available safe havens, the communication component may offer certain benefits (e.g., payment), or the benefits may be understood based on the third party's enrollment or registration with the service provider's contact list.

The method 100 also includes accepting (block 108) and confirming safe havens, and adding the accepted and confirmed safe havens to the database. For example, various third parties may, via their own action or upon being prompted by the solicitation of offers described above, confirm the availability of their space as a safe haven. The third party may limit the availability of their space as a safe haven for a specific time frame, or to a specific capacity. The service provider may then determine whether to accept the third party's space as a safe haven (e.g., whether to add the safe haven to the database as an available safe haven for vehicles during the triggering event). The analysis component may determine whether to accept the safe haven based on any limitations attached to the safe haven by the third party (e.g., time limitations or capacity limitations), and/or based on the value of the safe haven during the triggering event (e.g., where the value is determined based at least in part on the desirability of the location, the capacity of the safe haven, and other factors).

The method 100 also includes providing (block 110) benefits to the safe haven providers. For example, as previously described, the service provider may offer benefits (e.g., payment) to third parties willing to allow use of their spaces as safe havens. The benefits may be distributed to the third party based on the third party's decision to make its space available, or based on the service provider's accepting of the available space as a safe haven, or based on the actual use of the third party's space as a safe haven. The terms of the distribution of benefits may be agreed upon beforehand by the service provider and the third party.

While only certain features of the disclosure have been illustrated and described herein, many modifications and changes will occur to those skilled in the art. It is, therefore, to be understood that the appended claims are intended to cover such modifications and changes as fall within the true spirit of the invention.

The invention claimed is:

1. A system for moving an unoccupied autonomous vehicle to a safe haven during a weather-related triggering event, comprising:
a controller having a processor and a memory, wherein the memory comprises instructions stored thereon that, when executed by the processor, cause the controller to receive first data indicative of parameters of the weather-related triggering event and second data indicative of a plurality of capacities of a respective plurality of available safe havens, and in response to an analysis of the first data and the second data, and without driver input:
select the safe haven from the respective plurality of available safe havens;
determine two or more available routes between a vehicle location of the unoccupied autonomous vehicle and the safe haven;
select an appropriate route from the two or more available routes based on relative accessibility of the two or more available routes; and
control a steering of the unoccupied autonomous vehicle toward the safe haven selected by the controller.

2. The system of claim 1, wherein the controller is configured to select the safe haven from the respective plurality of available safe havens based on a correlation between parameters of the safe haven and the parameters of the weather-related triggering event.

3. The system of claim 1, wherein the parameters of the weather-related triggering event include a type of the weather-related triggering event, danger areas of the weather-related triggering event, a current location of the weather-related triggering event, an expected location of the weather-related triggering event, an extent of the weather-related triggering event, a current duration of the weather-related triggering event, and an expected duration of the weather-related triggering event.

4. The system of claim 1, wherein the controller is configured to select the safe haven from the respective plurality of available safe havens based on the vehicle location of the unoccupied autonomous vehicle.

5. The system of claim 1, wherein the controller selects the appropriate route from the two or more available routes at least in part by:
determining that an additional route of the two or more available routes is damaged or compromised by the weather-related triggering event; and
excluding the additional route.

6. The system of claim 5, wherein the controller determines that the additional route is damaged or compromised by flooding.

7. The system of claim 1, wherein the controller is configured to:
determine, based on the second data, a first subset of available safe havens having available space and a second subset of available safe havens not having available space; and
selecting the safe haven from the first subset of available safe havens.

8. The system of claim 1, wherein the controller is configured to:
determine an area expected to be affected by the weather-related triggering event;

locate a first potential safe haven within the area;
solicit an offer from a third party associated with the first potential safe haven to allow use of the first potential safe haven as part of the respective plurality of available safe havens;
receive and accept the offer from the third party; and
select the first potential safe haven as the safe haven.

9. The system of claim 8, wherein the controller is configured to:
determine a proposed payment benefit receivable by the third party contingent on receiving and accepting the offer from the third party;
communicate the proposed payment benefit to the third party; and
in response to receiving and accepting the offer from the third party, approve or distribute the proposed payment benefit to the third party.

10. A method of controlling movement of a plurality of autonomous vehicles during a weather-related triggering event, comprising:
receiving, at a controller, first location data indicative of a first location of each autonomous vehicle of the plurality of autonomous vehicles;
receiving, at the controller, second location data indicative of a second location of each available safe haven of a plurality of available safe havens;
receiving, at the controller, event data indicative of parameters of the weather-related triggering event;
receiving, at the controller and from the plurality of available safe havens, capacity data indicative of a plurality of capacities corresponding to the plurality of available safe havens;
determining, via the controller and based on an analysis of the capacity data, a first subset of available safe havens having available space and a second subset of available safe havens not having available space;
determining, via the controller and based on an additional analysis of the first location data and the second location data, a plurality of available routes for each autonomous vehicle of the plurality of autonomous vehicles between the first location of the autonomous vehicle and the second location of a respective safe haven selected for the autonomous vehicle from the first subset of available safe havens;
determining, via the controller and based on the event data, relative accessibilities of the plurality of available routes;
selecting, via the controller and for each autonomous vehicle of the plurality of autonomous vehicles, an appropriate route from the plurality of available routes based on the relative accessibilities of the plurality of available routes; and
initiating travel of each autonomous vehicle of the plurality of autonomous vehicles by steering each autonomous vehicle of the plurality of autonomous vehicles from the first location of the autonomous vehicle along the appropriate route selected therefor and to the second location of the respective safe haven selected therefor.

11. The method of claim 10, wherein receiving, at the controller, the event data indicative of the parameters of the weather-related triggering event comprises receiving, at the controller, information relating to a type of the weather-related triggering event, danger areas of the weather-related triggering event, a current location of the weather-related triggering event, an expected location of the weather-related triggering event, an extent of the weather-related triggering event, a current duration of the weather-related triggering event, and an expected duration of the weather-related triggering event.

12. The method of claim 10, wherein selecting the appropriate route from the plurality of available routes comprises:
determining that an additional route of the plurality of available routes is damaged or compromised by the weather-related triggering event; and
excluding the additional route.

13. The method of claim 12, wherein determining that the additional route is damaged or compromised by the weather-related triggering event comprises determining that the additional route is damaged or compromised by flooding.

14. The method of claim 10, comprising:
determining an area expected to be affected by the weather-related triggering event;
locating a first potential safe haven within the area;
soliciting an offer from a third party associated with the first potential safe haven to allow use of the first potential safe haven as part of the plurality of available safe havens;
receive and accept the offer from the third party; and
select the first potential safe haven as the respective safe haven for at least one autonomous vehicle of the plurality of autonomous vehicles.

15. A tangible, non-transitory, computer readable medium storing instructions thereon, wherein the instructions, when executed, are configured to cause a processor to:
receive vehicle data indicative of parameters of a plurality of autonomous vehicles, wherein the parameters of the plurality of autonomous vehicles include a plurality of locations corresponding to the plurality of autonomous vehicles;
receive safe haven data indicative of parameters of a plurality of available safe havens, wherein the parameters of the plurality of available safe havens include a plurality of capacities corresponding to the plurality of available safe havens;
receive weather-related event data indicative of parameters of a weather-related triggering event;
separate, based on the safe haven data, the plurality of available safe havens into a first subset of available safe havens having available space and a second subset of available safe havens not having available space;
determine, based on the vehicle data, the safe haven data, and the weather-related event data, a plurality of available routes for each autonomous vehicle of the plurality of autonomous vehicles between a respective location of the autonomous vehicle and a safe haven selected for the autonomous vehicle from the first subset of available safe havens;
select, for each autonomous vehicle of the plurality of autonomous vehicles, an appropriate route from the plurality of available routes based on relative accessibility of the plurality of available routes; and
initiate travel of each autonomous vehicle of the plurality of autonomous vehicles by steering the autonomous vehicle along the appropriate route selected for the autonomous vehicle toward the safe haven selected for the autonomous vehicle.

16. The medium of claim 15, wherein the parameters of the plurality of autonomous vehicles include a respective plurality of functional capabilities of the plurality of autonomous vehicles and a respective plurality of types of the plurality of autonomous vehicles.

17. The medium of claim 15, wherein the parameters of the weather-related triggering event comprise a type of the weather-related triggering event, danger areas of the weather-related triggering event, a current location of the weather-related triggering event, an expected location of the weather-related triggering event, an extent of the weather-related triggering event, a current duration of the weather-related triggering event, an expected duration of the weather-related triggering event, or any combination thereof.

18. The medium of claim 15, wherein the instructions, when executed, cause the processor to determine that an additional route of the plurality of available routes is damaged or compromised by the weather-related triggering event, exclude the additional route, and select the appropriate route instead of the additional route.

19. The medium of claim 18, wherein the instructions, when executed, cause the processor to determine that the additional route is damaged or compromised by flooding.

20. The medium of claim 15, wherein the instructions, when executed, cause the processor to:
  determine an area expected to be affected by the weather-related triggering event;
  locate a first potential safe haven within the area;
  solicit an offer from a third party associated with the first potential safe haven to allow use of the first potential safe haven as part of the plurality of available safe havens;
  receive and accept the offer from the third party; and
  select the first potential safe haven as the safe haven for at least one autonomous vehicle of the plurality of autonomous vehicles.

* * * * *